United States Patent [19]
Pierce et al.

[11] 3,745,822
[45] July 17, 1973

[54] APPARATUS FOR DETERMINING TEMPERATURE DISTRIBUTION AROUND A WELL

[75] Inventors: Aaron E. Pierce; Jerry G. Hillestad; Arthur G. Spillette; Claude E. Cooke, Jr.; William A. Burns, Jr., all of Houston, Tex.

[73] Assignee: Esso Production Research Company, Houston, Tex.

[22] Filed: Apr. 2, 1970

[21] Appl. No.: 25,139

[52] U.S. Cl..................................... 73/154, 73/341
[51] Int. Cl........................................... E21b 47/06
[58] Field of Search..................... 73/154, 344, 340, 73/341, 342; 33/205; 166/253, 254, 255

[56] References Cited
UNITED STATES PATENTS
3,363,457  1/1968  Ruehle et al......................... 73/154
3,122,016  2/1964  Fordham............................. 73/154

FOREIGN PATENTS OR APPLICATIONS
193,120  8/1967  U.S.S.R................................ 73/341

Primary Examiner—Jerry W. Myracle
Attorney—James A. Reilly, John B. Davidson, Lewis H. Eatherton, James E. Gilchrist, Robert L. Graham and James E. Reed

[57] ABSTRACT

This application discloses methods and apparatus for making temperature measurements around the circumference of a well to determine the presence and orientation of temperature gradients existing in the well. The preferred embodiment of the apparatus includes a temperature sensor assembly having multiple temperature probes which contact the well at points on its circumference and measure the differential temperature between these locations. The apparatus also includes a rotator assembly for moving the temperature sensor about its vertical axis for additional, subsequent temperature measurements. The apparatus further includes an orientation device for determining the direction or azimuth of the locations at which the differential temperature measurements are made.

5 Claims, 5 Drawing Figures

Aaron E. Pierce
William A. Burns, Jr.
Claude E. Cooke, Jr.
Jerry G. Hillestad
Arthur G. Spillette

INVENTORS

BY
Lewis H. Eatherton
ATTORNEY

Aaron E. Pierce
William A. Burns, Jr.
Claude E. Cooke, Jr.
Jerry G. Hillestad
Arthur G. Spillette

INVENTORS

BY
Lewis N. Eatherton

ATTORNEY

APPARATUS FOR DETERMINING TEMPERATURE DISTRIBUTION AROUND A WELL

BACKGROUND OF THE INVENTION

1. Field of the Invention.

This invention relates to methods and apparatus for measuring temperatures within a well. More specifically this invention relates to methods and apparatus for determining the existence and orientation of a temperature gradient around the circumference of a well.

2. Description of the Prior Art.

Among the more promising methods that have been suggested or tried for recovery of oil from viscous oil reservoirs are those which introduce thermal energy into the reservoirs. Typical processes of this type which are in current use include underground burning, hot water flooding, steam injection and well stimulation by steaming or burning.

In order to conduct such a thermal operation in the most efficient manner, it is important to know how heat is distributed within the reservoir. Accurate information on the areal heat distribution within the formation can permit adjustment of fluid injection-withdrawal rates to most effectively recover oil. Such information, if accurate, can also show the existence and location of anomalies in the formation such as fractures which may have been induced in the formation at the injection or withdrawal wells. Knowledge of the location and orientation of such fractures can be highly valuable in planning the development of the oil field.

Conventionally, representations of the areal heat distribution in a formation are approximated using data obtained from temperature observation wells. Such wells are normally of small diameter and contain a suitable temperature mesuring device at the heated, oil-bearing formation. Due to the cost of such wells, as few as possible are drilled, and consequently the data obtained from the wells are susceptible to misinterpretation. Since the temperature observation wells obtained information from a relatively few and isolated points in the formation, a number of differing but not unreasonable representations of the areal heat distribution may be derived from such information. A part of this problem is due to the fact that the temperature sensor is non-directional; it indicates the heat level at the observation well but cannot determine the direction of the heat source or the direction of heat movement with respect to the well.

Such a temperature observation point cannot readily be used to determine the orientation of a fracture or other such anomalies within the formation. Where a vertical fracture is induced at a steam injection well, it will approximate a planar heat source in the formation due to its high fluid and thermal conductivity. Even where a temperature observation well is located sufficiently close to such a fracture to indicate its presence by a high observed temperature, the orientation of the fracture cannot be determined since the temperature sensor in the well is non-directional. In other words, the fracture could be on either side of the temperature observation well, and the same temperature would be noted at the well.

One solution to this problem is to employ a vast number of temperature observation wells. This would give an accurate representation of the areal distribution of heat within the formation. However, such wells are expensive and a vast number would be prohibitive from an economic standpoint.

It has also been suggested that surface indicators be used to determine the areal distribution of heat within the formation. For example, it has been proposed that highly sensitive thermocouples be spaced at short intervals on the earth surface to determine the heat distribution within the formation. However, the portion of the earth between the formation and the surface is an effective insulating means which prevents effective and uniform transmission of heat to the detecting thermocouples. Moreover, in even relatively shallow formations the time lapse between the heating of a portion of a reservoir and the heating of a corresponding point on the surface to detectable levels can be so great that the results obtained are meaningless.

Another surface measuring technique relies on the pesence of hydrocarbon gases which result from the thermal process and which percolate from the formation to the surface. This technique is also subject to the faults of the surface thermocouple technique. The surface is effectively separated from the formation by the sediments which overlie it. It is difficult for measurable quantities of hydrocarbon gases to reach the surface. There can be a substantial time lag between the evolution of the hydrocarbon gases in the heated formation and their detection at the surface of the ground.

BRIEF SUMMARY OF THE INVENTION

This invention relates to methods and apparatus for making temperature measurements around the circumference of a well at a vertical location within the well. The preferred embodiment of the apparatus includes a rotator assemlby, an orientation device assembly and a temperature sensor assembly equipped with thermocouple probes. In operation the apparatus is lowered to the zone of interest by means of a multi-conductor cable. The thermocouple probes contact the wall of the well at various points on its circumference and differential temperature measurements are made. Subsequently additional differential temperature measurements are made at the same vertical location but at different points on the circumference of the wall of the well. Surface device display the measured differential temperatures and thus give an accurate representation of the temperature gradient existing at a vertical location within the well. Such a temperature gradient can be used to determine the direction from the well of a localized heat source in the formation such as a fracture. The temperature gradient at a number of wells can be used to determine the areal distribution of heat in the formation.

It is an object of this invention to provide a method and an apparatus for determining the areal distribution of heat within a formation in a thermal oil recovery process. It is another object of this invention to provide a method and an apparatus for determining the presence and orientation of fractures within a subterranean formation in which a thermal oil recovery process is conducted. It is another object of this invention to reduce the number of temperature observation wells necessary to accurately depict the areal distribution of heat within a formation in a thermal oil recovery process. Objects and features of the invention not apparent in the above discussion will become evident on consideration of the following drawings and description of the preferred embodiment.

DESCRIPTION OF THE PREFERRED EMBODIMENT

Figure 1:
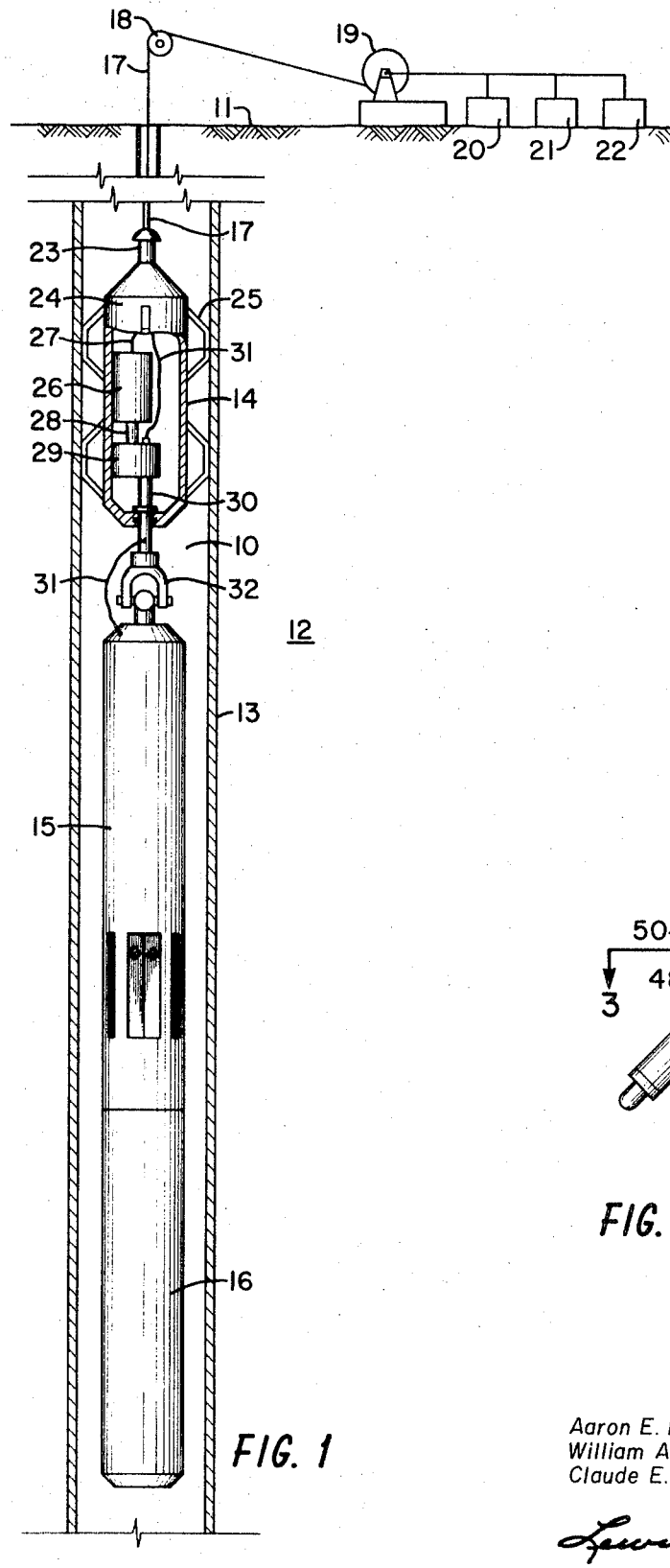
FIG. 1 is a cross-section of a well containing the preferred embodiment of the apparatus of this invention and, further, shows the related surface equipment.

Referring to the drawings in geeater detail, in FIG. 1 is shown a well 10 extending from the surface of the earth 11 and penetrating a subsurface formation 12. Typically, well 10 will be a temperature observation well. Preferably a casing string 13 has been placed within the borehole and cemented. However, the apparatus might be used in an uncased well.

The apparatus for measuring temperatures within a well may include three principal elements; a rotator assembly shown generally at 14, a temperature sensor assembly shown generally at 15, and an orientation device assembly shown generally at 16.

The apparatus and its component parts are suspended in the well 10 by a multi-conductor electrical cable 17. The multi-conductor cable 17 moves over a suitable pulley 18 at the wellhead, and a cable drum 19 raises and lowers the apparatus as desired. Suitable electrical signals are received from and transmitted through the multi-conductor cable to the rotator assembly control 20, the temperature sensor motor control 21 and the temperature sensor output 22.

The rotator assembly 14 is provided with a fishing neck 23 through which the multi-conductor cable 17 passes. The rotator housing 24 has centralizers 25 suitably attached to its external surface to minimize rotation of the exterior of the assembly.

As is shown in detail in FIG. 1, the rotator assembly 14 contains within the housing 24 a reversible electric motor 26 which is powered by the motor input leads 27 which are electrically connected through the multi-conductor cable 17 to the surface motor control 20. The rotator motor 26 has an output shaft 28 which in turn is connected to a suitable power transmission assembly 29, such as a gear box. Rotary power is thus transmitted to the transmission output shaft 30. The transmission output shaft 30 has a hollow central bore through which passes a multi-conductor cable 31 which is electrically interconnected with cable 17 and which provides the electrical circuitry for the temperature sensor assembly 15. The power transmission output shaft 30 of the rotator assembly 14 is connected to the temperature sensor assembly 15 by a suitable flexible joint 32. Thus, when the rotator motor 26 is actuated by the operator at the surface motor control 20, the temperature sensor assembly 15 will rotate about its vertical axis. The rotator assembly 14 will tend to remain stationary due to the frictional contact of the centralizers 25 with the wall of the well.

Figure 2:
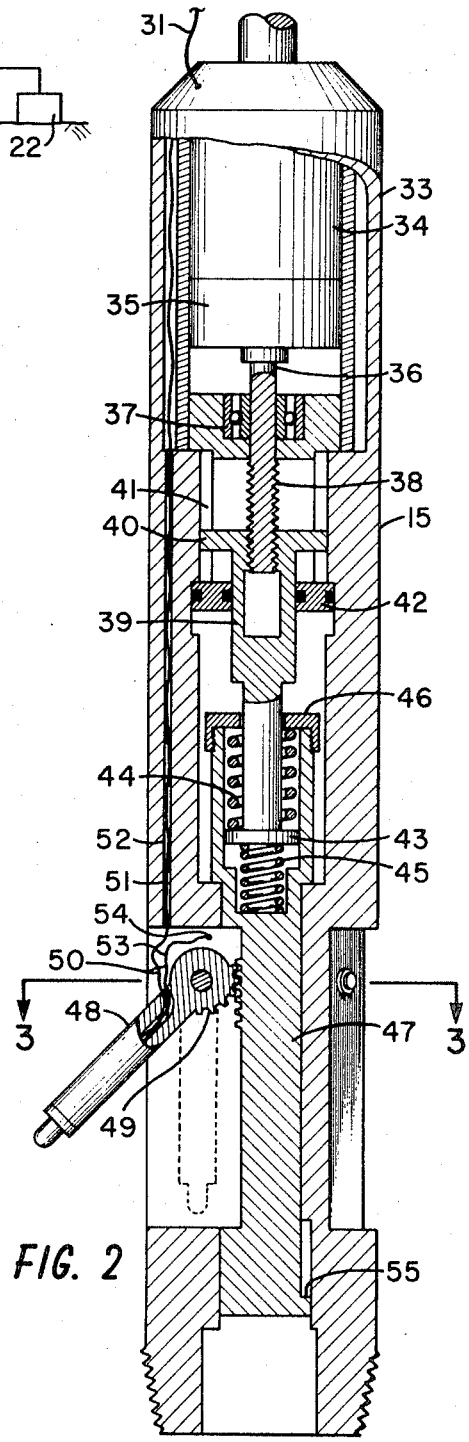
FIG. 2 is a view in partial cross-section showing details of the temperature sensor assembly.

Referring to FIG. 2, the temperature sensor assembly 15 can be seen in greater detail. Te assembly is provided with an external housing 33 which couples at its lower end with the orientation device 16. At the upper end of the external housing 33 there is a suitable opening through which the multi-conductor cable 31 passes. Suitable leads from the multi-conductor cable 31 are provided for powering the electrical reversible temperature sensor motor 34 which supplies rotary power to a suitable power transmission 35. The power transmission output shaft 36 is journaled by bearings 37 and has a threaded lower end 38. A connecting member 39 has a threaded central bore which mates with the threaded lower end of the power output shaft 38. Keys 40 are provided at the upper end of the connecting member 39 which ride in key slots 41. Thus, rotation of the output shaft 36 causes vertical movement of the connecting member 39 since rotational motion of the member is prevented by keys 40 and slots 41. Hydraulic seals 42 are provided on the exterior of the connecting member 39 to prevent entry of well fluids into the temperature sensor motor 34 and power transmission 35.

The lower end of connecting member 39 is provided with a flange 43 which bears against spring 44 and spring 45. The springs 44 and 45 provide a proper dampening action to movement of the connecting member 39 and prevent overpowering motor 34. The connecting member 39 passes through a suitable central opening in the cover member 46 which is threadably connected to rack member 47. As the connecting member 39 moves upward due to rotation of the power output shaft 36, spring 44 will compress and bear against the cover member 46. This upward force will cause the rack member to move vertically upward and move the probe assembly 48 to its retracted position as shown by the dotted lines in FIG. 2 through the action of the pinion gear 49 and the rack on the rack member 47. As the connecting member moves down, the probe assembly will move to the extended position as shown in FIG. 2 in a similar manner.

The preferred embodiment of the temperature sensor assembly has three probe assemblies 48 spaced at approximately 120° intervals about the vertical axis of the temperature sensor. FIG. 2 illustrated the interconnection between the temperature sensor assembly and one of the probe assemblies. FIG. 2, also, shows the interconnection of the thermocouple leads 50 with the probe assemblies 48 and the multi-conductor cable 31.

As is shown in FIG. 2, each of the probe assemblies 48 is provided with a central bore through which thermocouple leads 50 pass. From each of the probes, one thermocouple lead 51, for example copper wiring, passes through one of the slots 52 in the temperature sensor housing 33 and electrically connects to the multi-conductor cable 31. The second thermocouple lead 53 of a dissimilar metal, for example constantin, passes into one of the slots 54. As will be seen more clearly in FIG. 4, the constantin thermocouple lead has a "Y" junction with one wire passing to a similar junction at each of the other probe assemblies. The lower end of the rack member 47 is provided with a protective stop 55 in a suitable slot to prevent override of the rack and pinion gearing. A similar stop is provided by the abutment of the rack member 47 with the housing 33 at a point above the probe assemlbies 48.

Figure 3:
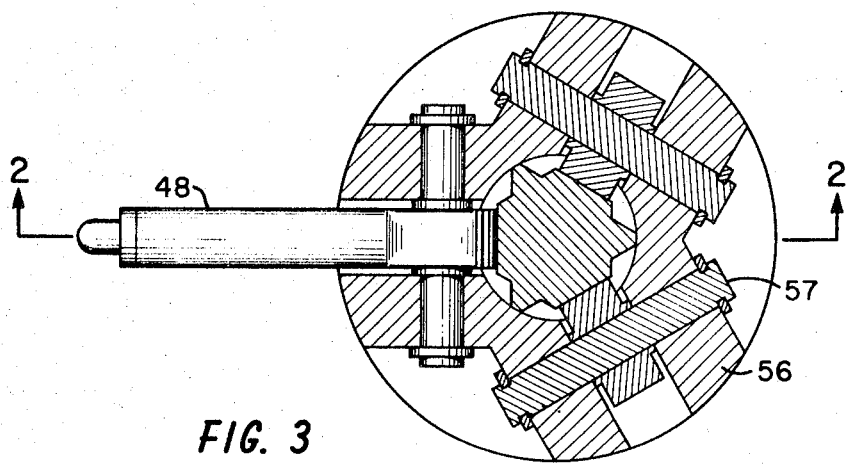
FIG. 3 is a sectional view of the temperature sensor assembly across the section 3—3 of FIG. 2 and shows the probe assemblies and rack member.

FIG. 3 shows the relative positions of the three probes 48 in the temperature sensor. For clarity, one of the probes is shown in its extended position; however, it should be understood that in operation all of the probes will be in the same position. The probes 48 are mounted on the probe assembly yoke 56 by bearings 57 to permit movement between their extended and retracted positions. The yoke 56 may be an integral part of the housing 33.

Figure 4:
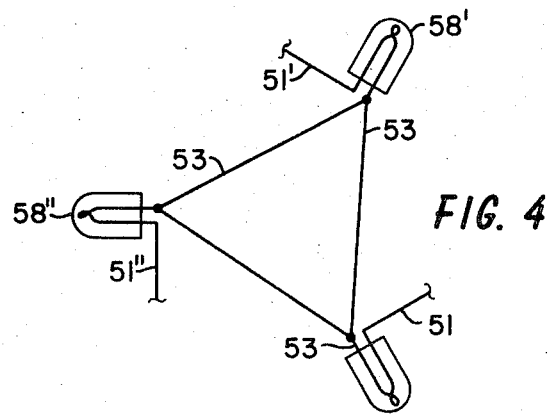
FIG. 4 is a schematic wiring diagram which shows the interconnections of the thermocouple leads and the probe assemblies.

The electrical interconnection between the thermocouple leads and their relationship to the probe assembly tips can be seen in FIG. 4. Two thermocouple leads 51 and 53 extend from each probe tip 58. One lead 53 forms a "Y" junction and one of these wires 53 passes to a similar junction at each of the other probes. The other lead 51 from each of the probes electrically interconnects with the multi-conductor cable 31 to transmit an electrical signal to the temperature sensor output 22 at the surface. Except for the point of interconnection between leads 51 and 53 in the probe tip 58, all of the thermocouple leads are suitably insulated.

Figure 5:
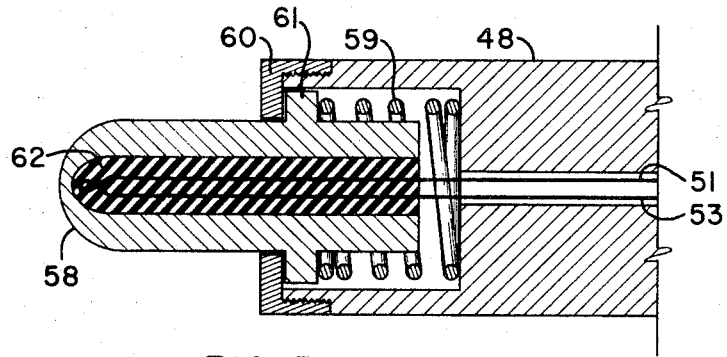
FIG. 5 is a cross-sectional view showing the details of the probe tip of the probe assembly.

Details of the probe tip 58 can be seen in FIG. 5. The probe tip 58 must have a high thermal conductivity and may be metallic such as a suitable nickel alloy. A biasing spring 59 may be used which will force the tip 58 outward relative to the probe 48. Such a biasing spring will help insure proper contact of all probe tips with the wall of the well where the well does not have a circular cross-section at the location of measurement. The probe tip 58 is secured within the probe by cap 60 and flange 61. The thermocouple leads 51 and 53 are positioned in a central bore in the probe tip 58 and are secured in the tip by an electrically insulating potting material 62 having a high thermal conductivity such as an epoxy resin.

The function of the apparatus shown in FIGS. 1–5 is to measure the temperature around the circumference of a well. The manner in which this function is accomplished can perhaps be most readily seen with reference to the FIGURES. The apparatus is lowered down well 10 on the multi-conductor cable 17 to the subsurface formation of interest 12. The depth to which the apparatus has been lowered can be measured by any convenient means such as a collar locator (not shown) which may be attached to the apparatus or otherwise suspended from the multi-conductor cable 17.

As the apparatus is lowered down the well, the probe assemblies 48 are in their retracted positions as shown by the dotted lines in FIG. 2. When the zone of interest has been reached by the apparatus as indicated by the collar log, the probe assemblies are moved to their extended position to contact the wall of the well at about the same vertical location on its circumference. The probe assemblies are extended by actuation of the temperature sensor motor control 21 at the surface by the operator. This actuation causes the rack member 47 to move downward in the manner previously described and pushes the probes 48 against the casing 13.

When a probe assembly tip contacts a point on the casing wall having a given temperature, a differential voltage will be induced between leads 51 and 53 due to their bi-metallic character. As can be seen from the schematic wiring diagram of FIG. 4, when probe tips 58' and 58" contact points on the casing wall which have different temperatures, a differential voltage will be induced between their respective thermocouple leads 51' and 51". The differential voltage between each pair of the thermocouple leads (51–51', 51'–51", 51–51") will be transmitted to the temperature sensor output 22 at the surface by means of the multi-conductor cable 17. The operator can therefore determine the temperature differential existing between the points on the casing contacted by the probe tips 58 by reading a suitable indicator such as a potentiometer at the temperature sensor output 22. Of course, each of the leads 51 must be distinguishable by the operator. This can be conveniently done by color-coding the leads.

After one set of differential temperatures is determined in the manner described, additional differential temperatures may be determined in the same vertical location in the casing string 13 at about the same point in time as the first measurements. In other words when temperature measurements are made in a sequential manner in the practice of this invention, the time lapse between measurements should not be so great that there will be any significant change in the temperature conditions in and around the well. If the temperature of the casing wall varied evenly, the highest temperature would be at one point and the lowest temperature would be at a second point diametrically opposed to the first. In such a case, there would be no need for additional temperature measurements. The three differential temperature measurements determined by the three probes would give a reasonable approximation of the temperature distribution around the well. However, in actual practice it has been found that the well temperature is seldom so evenly distributed.

Uneven distribution of temperature in the casing wall 13 requires a series of measurements to get an accurate representation of the temperature of the casing. Preferably, the temperature differentials should be measured in increments of no more than 30° to get an accurate temperature profile of the casing wall. When a three probe assembly is used, such as is illustrated in the drawings, this will require that the assembly be rotated to at least four different positions with three differential temperature measurements being made at each position.

The rotation of the temperature sensor assembly 15 and the interconnected orientation device 16 is accomplished by the rotator assembly 14. After the first differential temperature measurements are made in the manner previously described, the probe assemblies are withdrawn to the retracted positions as shown in FIG. 2. The operator then induces the proper signal at the rotator assembly control 20 to actuate the rotator motor 26 and to provide the desired change in angularity of transmission output shaft 30. This will rotate the temperature sensor assembly 15 to its new position. After the temperature sensor assembly has come to rest in its new position, the probe assemblies 48 are again extended, and the differential temperatures between three other points on the casing are determined. Additional measurements at other points on the circumference of the casing are made in a like manner.

The temperature sensor assembly 15, with or without the rotator assembly 14, can be used to determine the existence of a temperature gradient around the circumference of the wall of the well. In most instances, however, it will be desirable to know the orientation of the temperature gradient, i.e., the direction or azimuth of the hottest and coldest points on the welbore wall, as well as the existence of such a gradient. This is conveniently done using an orientation device assembly 16 which will indicate the direction or azimuth of the temperature sensor assembly during the temperature measurements. A number of devices are commercially available which will perform this function. Some are magnetic devices; others locate a predetermined point on the casing wall which has a known azimuth; some use gyroscopic means. Certain of the devices have internally contained recorders with no surface indicators; others transmit their orientation to the surface through a suitable electric conductor. An example of one suitable device for performing this function is the Gyroscopic Directional Multi-shot Survey Instrument avilable under the trade name of "Surwel" from Sperry-Sun Well Surveying Company. This device will measure and record its direction or azimuth with respect to time. Since the orientation device 16 is connected to the temperature sensor 15, this measurement and recording will determine the orientation of the temperature sensor during its operation.

As a result of these operations the operator can obtain differential temperature measurements on the casing wall at various points in time. These data could then be correlated with the time-directional survey from the Surwel instrument to obtain a record of differential temperature of the casing wall as a function of direction.

While the foregoing describes the preferred embodiment of the applicants' invention and the best mode of operating that invention, other embodiments are intended to be encompassed by the scope of this application. For example, the probe assemblies need not be extendable and retractable as shown in FIG. 2. These probe assemblies could be permanently spring-biased against the walls of the casing in a manner similar to the centralizers 25. Such an embodiment is not preferred however, since frictional contact between the probe assemblies and the casing will cause the probe assemblies to heat. If the probe assemblies are so heated, it will be necessary to wait until this heat has dissipated and the probe assemblies have reached thermal equilibrium before a measurement is made.

In another embodiment the device can be non-rotating. In such an embodiment, the rotator assembly 14 and the rotator assembly control 20 would be unnecessary. In the absence of an extremely uneven temperature distribution in the wall of the well, three probe assemblies will give a reasonably accurate and useful representation of the temperature profile at the point of measurement. Additional probe assemblies will more accurately define the temperature profile of the casing. However, the mechanical and electrical complexity of an embodiment having more than three probes makes the device illustrated in FIGS. 1–5 preferred.

In another embodiment fewer than three probe assemblies could be used. A two probe assembly could be used to obtain differential temperature measurements. A single probe assembly with both thermocouple lead 51 and thermocouple lead 53 extending to the surface could be employed. Such an embodiment would measure the absolute temperature of the casing at a single location and mlutiple measurements at about the same point in time would have to be made to get an accurate temperature profile at one vertical location on the casing wall. Moreover, due to the small differences in temperature around a typical well, differential temperature measurements are preferable to absolute temperature measurements. For convenience and clarity, both absolute temperatures and differential temperatures are referred to herein collectively as simply "temperatures." In a like manner both types of measurements are referred to as temperature measurements.

Any convenient device for rotating the apparatus of this invention may be used. In lieu of the motor driven device of the preferred embodiment, a hydraulically-actuated device as illustrated in U.S. Pat. No. 3,426,851 or mechanically actauted devices as illustrated in U.S. Pat. No. 2,998,068 or U.S. Pat. No. 3,426,849 might be employed. Also thermal measuring devices other than thermocouples might be employed. For example, highly sensitive and accurate thermistors are commercially available and could be conveniently used.

The principle of the invention and the best mode in which it is contemplated to apply that principle have been described. It is to be understood that the foregoing is illustrative only and that other means and techniques can be employed without departing from the true scope of the invention defined in the following claims.

What is claimed is:

1. An apparatus adapted to be lowered into a well for measuring the temperature distribution around the circumference of the well which comprises means for measuring the differential temperature existing between a plurality of circumferentially spaced locations on the wall of the well, said temperature measuring means comprising a temperature sensor assembly having at least three probe assemblies spaced about the vertical axis of the temperature sensor assembly, said probe assemblies having means for measuring the temperature of the wall of the well at said circumferentially spaced locations and being electrically interconnected to determine the differential temperature between said circumferentially spaced locatons, said temperature sensor assembly includes means for extending said probe assemblies to contact the wall of the well and for retracting said probe assemblies into the temperature sensor assembly and means operatively interconnected with said temprature measuring means for determining the orientation of said circumferentially spaced locations.

2. An apparatus adapted to be lowered into a well for measuring the temperature distribution around the circumference of the well which comprises means for measuring the differential temperature existing between a plurality of circumferentially spaced locations on the wall of the well, said temperature measuring means comprising a temperature sensor assembly having a plurality of probe assemblies spaced about the vertical axis of said sensor assembly with means for determining the temperature of the wall of the well and means for rotating said temperature assembly about the vertical axis of said assembly to determine the temperature of the wall of the well at said circumferentially spaced location, said temperature sensor assembly having at least three probe assemblies, and means operatively interconnected with said temperature measuring means for determining the orientation of said circumferentially spaced locations.

3. An apparatus as defined by claim 2 wherein said temperature sensor assembly includes means for extending said probe assemblies to contact the wall of the well and for retracting said probe assemblies into the temperature assembly.

4. A combination adapted to be lowered into a well for measuring temperatures around the circumference of the wall of the well which comprises an apparatus adapted to be lowered into a well for measuring temperatures on the wall of the well at circumferentially spaced locations at about the same vertical level in the well which comprises a temperature sensor assembly including a plurality of probe assemblies spaced about the vertical axis of said sensor assembly and having means for measuring differential temperature between said circumferentially spaced locations at about the same point in time and means for rotating said apparatus about the vertical axis of the apparatus.

5. An apparatus adapted to be lowered into a well for measuring the temperature distribution around the circumference of the well which comprises a temperature sensor assembly having a plurality of probe assemblies including means for measuring the differential temperatures between circumferentially spaced locations at about the same vertical level in the well at about the same point in time and having means for extending and retracting the probe assemblies into, and out of contact with, the wall of the well, means for rotating said temperature sensor assembly about the vertical axis of said sensor assembly, and means operatively interconnected with said temperature sensor assembly for measuring the orientation of said circumferentially spaced locations.

* * * * *